8605X
J. L. STANLEY & J. C. HOWARD.
HORSE POWER.
Patented Jan. 16, 1835.
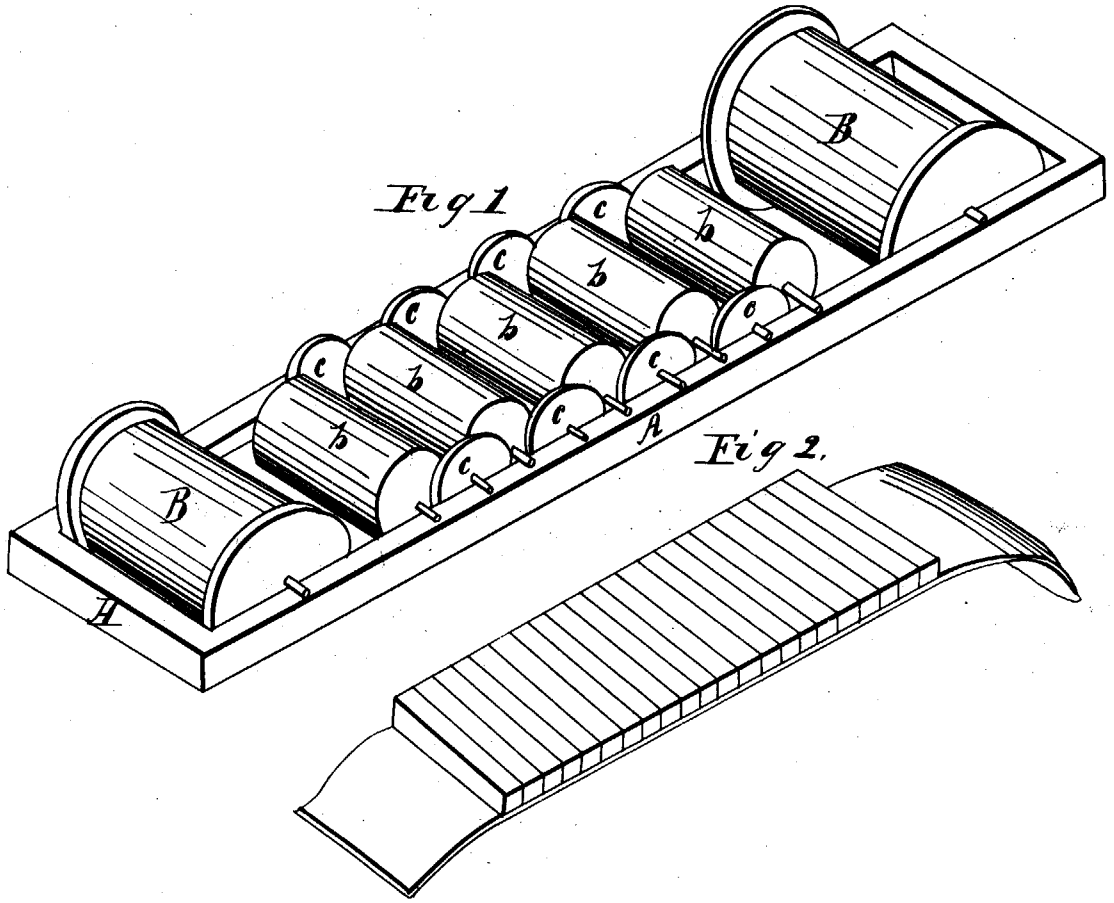
THE NORRIS PETERS CO., PHOTO-LITHO., WASHINGTON, D. C.

Jonathan L Stanley & James C. Howard, Winthrop Maine

Letters Patent

The schedule referred to in these Letters Patent and making part of the same, containing a description in the words of the said Jonathan Lee Stanley & James Copeland Howard themselves of their improvement in the Endless Band for Horse Power To all to whom these presents shall come, Be it Known that we, Jonathan Lee Stanley & James Copeland Howard, of Winthrop in the County of Kennebec and State of Maine, have invented a new and useful improvement in the Endless Band for Horse Power, and that the following is a full and exact description of the construction and operation of the said machine as invented by us.

We make a band of stout sole Leather, fourteen inches more or less, as occasion may require in width. To this band we attach lags or slats of wood of a suitable length & thickness. The ends of the band then being connected together and endless band of lags is then formed. This band we pass over drums of suitable size fixed in a frame, there being a ledge or shoulder projecting upward at the end of each drum to prevent the lags or band from running off. To prevent the sagging of the band, we adopt the following plan or arrangement of rollers viz, next to the drum at the head of the machine we pass a shaft across the frame, resting on each side of it. On each end of this shaft, but within the frame, we place a roller or pulley. Next to this shaft, but within the frame we insert a cylinder of a length nearly sufficiently to fill the space between the rollers aforesaid, its gudgeons passing by them, and resting on the sides of the frame. Next to this cylinder, we place a shaft with pullies on the ends as at first – then a cylinder

8605X and so on alternately, until the space from the drum to drum is filled — reference to the plate — A A (Fig 1) is the Frame, B B the drums on which the band of lags passes, c c the pullies — b b the cylinders — Fig 2 shows the sole Leather band with some of the lags attached,

Claims

What we claim as our improvement, and for which we request an exclusive right, is, 1, Our plan of making and using a band of sole Leather as above specified. 2, our plan or system of friction rollers and cylinders for preventing the sagging of the Endless Band and to diminish the friction of the drums as above specified —

In testimony that the above is a true specification, as above described, of our said improvement, we have hereunto set our hands, this first day of December A.D. 1834

Witnesses
Peleg Benson Jr.
Caleb Harris

Jonathan L Stanley
James C Howard ned

IHT (492 words)

(Drawing)

(Patented 16th January 1835.)